United States Patent [19]
Abdel-Malek et al.

[11] Patent Number: 5,550,880
[45] Date of Patent: Aug. 27, 1996

[54] MOTOR CURRENT SIGNAL PROCESSOR USING ANALOG SUBSTRACTION OF AN ESTIMATED LARGEST SINE WAVE COMPONENT

[75] Inventors: Aiman A. Abdel-Malek, Schenectady; John E. Hershey, Ballston Lake; Gerald B. Kliman, Schenectady; Rudolph A. A. Koegl, Niskayuna, all of N.Y.

[73] Assignee: General Electric Company, Schenectady, N.Y.

[21] Appl. No.: 521,503

[22] Filed: Aug. 30, 1995

[51] Int. Cl.$^6$ .................................................. H03D 3/24
[52] U.S. Cl. .......................... 375/376; 327/299; 327/551; 318/629
[58] Field of Search ............................... 375/376; 318/611, 318/629; 327/299, 361, 362, 355, 549, 551, 552, 555, 556; 455/206, 305, 306

[56] References Cited

U.S. PATENT DOCUMENTS 4,569,072  2/1986  Van Roermund ...................... 455/306
5,124,657  6/1992  Waller, Jr. ................................. 327/551
5,448,598  9/1995  Yousefi et al. ........................... 327/299

OTHER PUBLICATIONS

"Methods of Motor Current Signature Analysis" By GB Kliman, et al, Electric Machines & Power Systems, 20:463–474, 1992.

Primary Examiner—Stephen Chin
Assistant Examiner—Thuy-Lieu Nguyen
Attorney, Agent, or Firm—Ann M. Agosti; Marvin Snyder

[57] ABSTRACT

A signal processing system includes a phase locked loop for locking a largest sine wave phase and frequency element of an incoming analog signal; an amplitude estimator for estimating a maximum amplitude of the incoming signal; a multiplier for multiplying the estimated largest sine wave phase and frequency element by the estimated maximum amplitude to provide an estimated largest sine wave component; and a subtractor for subtracting the estimated largest sine wave component from the incoming signal to provide a diagnostic signal.

11 Claims, 1 Drawing Sheet

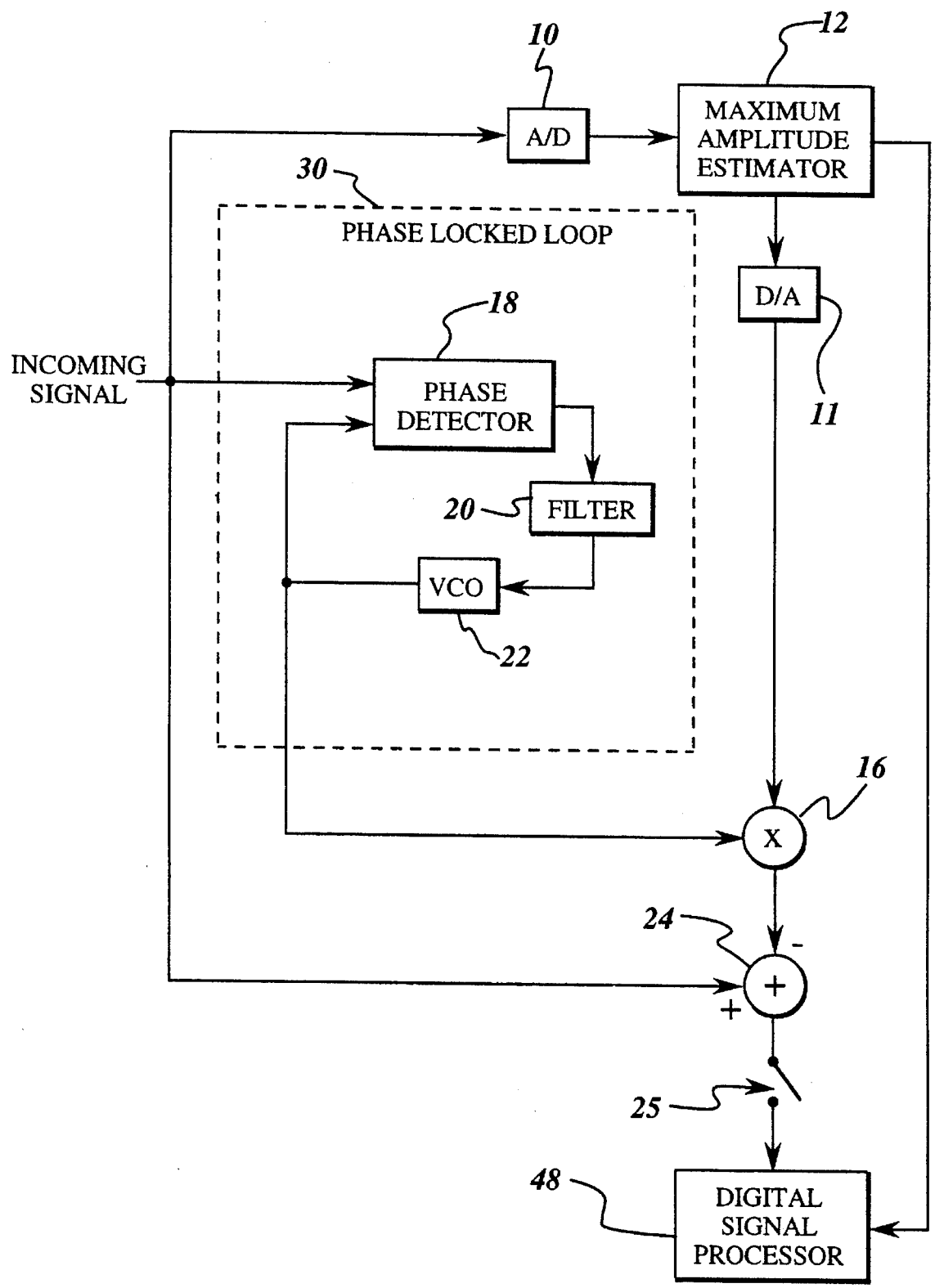

MOTOR CURRENT SIGNAL PROCESSOR USING ANALOG SUBSTRACTION OF AN ESTIMATED LARGEST SINE WAVE COMPONENT

CROSS-REFERENCE TO RELATED APPLICATION

This application is related to the following co-pending application which is commonly assigned: J. E. Hershey, "Motor Current Signal Processor Including Phase Locked and Delta Modulator Loops," U.S. application Ser. No. 08/521,501, filed concurrently herewith.

BACKGROUND OF THE INVENTION

Special signal processing can be performed in motor control centers to determine fault conditions of rotating machinery such as a broken or damaged bar in an induction motor, for example. One technique described in G. B. Kliman and J. Stein, "Methods of Motor Current Signature Analysis," Electric Machines and Power Systems, vol. 20, pp. 463–474, 1992, ascertains a broken bar condition by interpreting the power line spectra. The signals that are important for diagnosis are of very small magnitude as compared to the largest sine wave component, which is typically the fundamental (first harmonic) component of the line current occurring at a frequency of about 60 hertz. The frequency location of signals that are used to diagnose a broken bar are dependent on the slip and the synchronous speed (which is a function of the number of poles and the frequency of the largest sine wave component).

A long term fourier transform can be used both to reduce the windowing leakage that results from sampling a time limited waveform and to determine the presence of a frequency component produced by a broken bar. A long term fourier transform, however, has several limitations. For example, the largest sine wave component frequency can vary during a long term average. Furthermore, the motor's load can vary with time, thus altering the slip and spreading the signal of interest over a wider frequency range to reduce its peak power per hertz. Additionally, a large magnitude component requires that a digital signal analysis system quantize data in such a way that the necessary dynamic range is provided. Proposed extensions of these techniques to motor faults other than broken bars requires increased sensitivity and dynamic range on the order of 90–110 decibels.

Demodulation on the 60 Hz carrier (largest component) and extremely narrow band (notch) filtering have been used in attempts to remove the largest sine wave component before signal processing. A limitation of simple demodulation is the potential aliasing of the frequencies below the largest sine wave frequency, and a limitation of notch filtering is the small modulation of the largest sine wave frequency and therefore the differing degrees of attenuation due to the filter's "skirts" resulting in artifact modulations.

SUMMARY OF THE INVENTION

The present invention performs prediction and subtraction of the largest sine wave component prior to quantization and signal analysis. The invention results in a reduced number of bits needed in an analog-to-digital (A/D) converter of a digital signal processor as compared with the required number of bits if the largest sine wave component were not significantly reduced because prior removal of the largest sine wave component will greatly reduce the required dynamic range.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings, where like numerals represent like components, in which:

The FIGURE is a block diagram of an embodiment of the present invention.

DETAILED DESCRIPTION OF A PREFERRED EMBODIMENT OF THE INVENTION

The FIGURE is a block diagram of an embodiment of the present invention. An incoming signal such as a current is directed to a phase locked loop (PLL) 30, an analog-to-digital (A/D) converter 10, and a subtractor 24. It is assumed that the largest sine wave component (typically at 60 Hz) is very large as compared with the other signals of interest. Therefore a first order PLL can be used. If desired, higher order loops can be used, as shown by the presence of a loop filter 20. In the embodiment of FIG. 1, the phase locked loop comprises a phase detector 18, loop filter 20, and a voltage controlled oscillator (VCO) 22.

For a first order loop there is no filter and the loop has the transfer function:

$$H(j\omega)=K/(j\omega+K),$$

wherein K represents the loop gain in radians per second. VCO 22 receives the output signal from the phase detector if a first order loop is used (or the output signal from the loop filter 20 if a higher order loop is used) and supplies a VCO output signal to phase detector 18.

Preferably, the central angular frequency of the VCO is set to the line frequency, e.g., $2\pi \times 60$ radians-Hz, and K is set to $2\pi$ radians-Hz. Therefore the synchronization range of the loop is approximately 59–61 hertz. PLL 30 thus recovers nearly the exact phase and frequency element of the largest sine wave component.

A/D converter 10 can be used to convert the incoming signal to a digital value prior to processing by maximum amplitude estimator 12 which may comprise a digital comparator for determining the approximate amplitude of the largest sine wave component in a given period. Alternatively, the amplitude estimator itself may comprise analog components or an A/D converter in combination with a comparator. The estimated amplitude can be passed to a digital signal processor 48 for further evaluation, if desired.

If the incoming analog signal was converted to a digital signal, the estimated amplitude is preferably converted back to an analog signal by a digital-to-analog (D/A) converter 11 prior to its combination with the phase and frequency element provided by the PLL 30 (the VCO output signal). The estimated amplitude and the phase and frequency element can be combined using a multiplier 16, for example, to obtain the estimated largest sine wave component. In one embodiment, multiplier 16 multiplies the phase and frequency element by M/V (the approximate amplitude (M) of the largest sine wave component divided by an intrinsic amplitude (V) of output signals of the VCO). The division by V (when V is not equal to one volt) is useful for preventing intrinsic magnitudes in the VCO from interfering with the estimation of the largest sine wave component. The estimated largest sine wave component is subtracted from the incoming signal by subtractor 24 which provides a diagnostic signal for fault evaluation.

In one embodiment, the loop is given an initial phase detection period of 10 seconds to acquire the phase and frequency data. After 10 seconds switch 25 is closed and the data is sent to digital signal processor 48 for evaluation.

The diagnostic signal can be filtered by a low pass filter (not shown) to excise higher order harmonics before being supplied to the digital signal processor which can then convert the signal to digital form and further manipulate and analyze the signal using conventional spectrum analyzing techniques such as those described in aforementioned Kliman et al.

Thus the device of the present invention can predict the portion of the incoming signal that is primarily the largest sine wave component. The largest sine wave component is typically many decibels higher than that of the diagnostic signals. By predicting this larger component and subtracting it, it is possible to more accurately quantize the remainder (the non-predictable component) which will be a combination of (1)load modulations and other modulations of the largest sine wave component; (2) random or random-like noise; and (3) diagnostic signals.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A signal processing system comprising:

a phase locked loop for locking a largest sine wave phase and frequency element of an incoming analog signal;

an amplitude estimator for estimating a maximum amplitude of the incoming signal;

a multiplier for multiplying the largest sine wave phase and frequency element by the estimated maximum amplitude to provide an estimated largest sine wave component; and a subtractor for subtracting the estimated largest sine wave component from the incoming signal to provide a diagnostic signal.

2. The signal processing system of claim 1 further including an analog-to-digital converter for digitizing the incoming signal and sending a digitized incoming signal to the amplitude estimator, and a digital-to-analog converter for converting the estimated maximum amplitude into an analog signal.

3. The signal processing system of claim 2 wherein the phase locked loop comprises a phase detector for providing a phase control signal derived from the incoming analog signal, and a voltage controlled oscillator coupled to the phase detector for using the phase control signal to provide the largest sine wave phase and frequency element to the multiplier and the phase detector.

4. The signal processing system of claim 1 wherein the multiplier is further capable of dividing the largest sine wave phase and frequency element by an intrinsic amplitude of the voltage controlled oscillator.

5. The signal processing system of claim 3 wherein the phase locked loop further includes a filter coupling the phase detector to the voltage controlled oscillator for filtering the phase control signal and providing a filtered signal to the voltage controlled oscillator.

6. The system of claim 1, further comprising a digital signal processor, and a switch between the subtractor and the digital signal processor for passing the diagnostic signal to the digital signal processor after an initial phase and frequency detection period.

7. A signal processing method comprising the steps of:

locking a largest sine wave phase and frequency element of an incoming analog signal;

estimating a maximum amplitude of the incoming signal;

multiplying the largest sine wave phase and frequency element by the estimated maximum amplitude to provide an estimated largest sine wave component; and subtracting the estimated largest sine wave component from the incoming signal to provide a diagnostic signal.

8. The method of claim 7, further including digitizing the incoming signal prior to estimating the maximum amplitude of the incoming signal.

9. The method of claim 8, wherein the step of locking the largest sine wave phase and frequency element of the incoming signal includes detecting the phase and frequency element of the incoming signal with a phase detector, filtering the detected phase and frequency element, passing the filtered detected phase and frequency element through a voltage controlled oscillator to provide the largest sine wave phase and frequency element, and supplying the largest sine wave phase and frequency element to the phase detector.

10. The method of claim 7, wherein the step of multiplying the largest sine wave phase and frequency element by the estimated maximum amplitude includes dividing the largest sine wave phase and frequency element by an intrinsic amplitude of the voltage controlled oscillator.

11. The method of claim 7, wherein the step of locking the largest sine wave phase and frequency element comprises using a phase locked loop to lock the largest sine wave phase and frequency element of the incoming signal, and wherein the step of subtracting the estimated largest sine wave component from the incoming signal occurs after an initial phase detection period having a length of time sufficiently long for the phase locked loop to derive a proper phase and frequency.

\* \* \* \* \*